No. 678,452. Patented July 16, 1901.
E. H. ANGLE.
TOOTH REGULATOR.
(Application filed Jan. 21, 1901.)
(No Model.)

Witnesses
W. A. Alexander
J. R. Watkins

Inventor
Edward H. Angle
By Attorneys
Towle & Bryson

UNITED STATES PATENT OFFICE.

EDWARD H. ANGLE, OF ST. LOUIS, MISSOURI.

TOOTH-REGULATOR.

SPECIFICATION forming part of Letters Patent No. 678,452, dated July 16, 1901.

Application filed January 21, 1901. Serial No. 43,964. (No model.)

*To all whom it may concern:*

Be it known that I, EDWARD H. ANGLE, a citizen of the United States, residing at the city of St. Louis, in the State of Missouri, have invented a certain new and useful Tooth-Regulator, of which the following is such a full, clear, and exact description as will enable any one skilled in the art to which it appertains to make and use the same, reference being had to the accompanying drawings, forming part of this specification.

My invention relates to what are commonly known in the art of tooth regulation as "traction - screws." The traction - screw consists primarily in a resistance member fastened to the anchor tooth or teeth, a delivery member attached to the tooth to be moved, and an adjustable bar connecting these two members and exerting a pushing or pulling force upon the malposed tooth which it is desired to move into its proper position in the dental arch.

Still more particularly my invention relates to improved means for attaching the traction-bar itself to the tooth to be moved, so as to obtain a sufficiently rigid attachment for exerting the moving force in the desired direction and at the same time leaving the bar the desired mobility in other directions.

Figure 1:
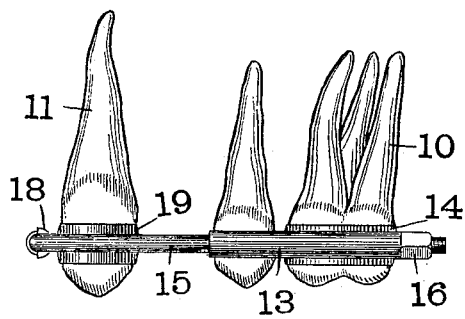
Figure 3:
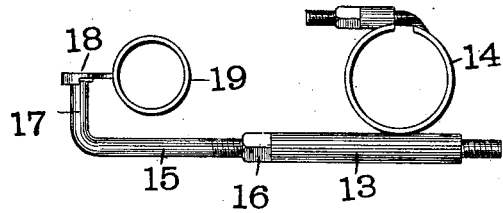
Figure 2:
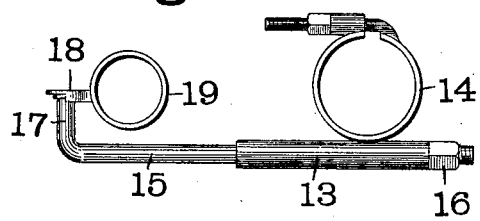
Figure 4:
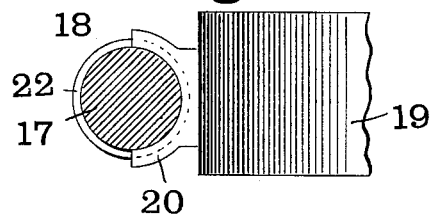
Figure 5:
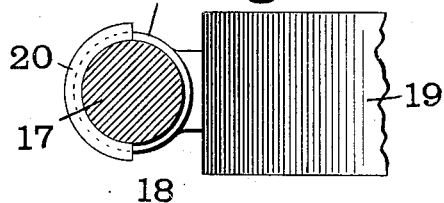

In the drawings attached hereto, in which like characters of reference refer to like parts in the several views given, Figure 1 is a side view of my apparatus as applied to the teeth. Fig. 2 is a plan view of the apparatus shown in Fig. 1. Fig. 3 is a plan view of a slightly-modified form of my apparatus. Figs. 4 and 5 are respectively enlarged detail views, partly sectional, of the delivery members shown in Figs. 2 and 3; and Fig. 6 is an enlarged sectional view of the delivery member shown in Fig. 5.

Referring first to Fig. 1, 10 represents the anchor-tooth, here represented as one of the molar teeth, which affords the resistance for moving the malposed cuspid 11. To the anchor-tooth 10 is rigidly fastened, as shown also in Figs. 2 and 3, the resistance-tube 13 by means of the band 14, clamped firmly upon said tooth. The bar 15 closely fits said tube and is screw-threaded at its rear end. The screw-threaded portion carries upon it the nut 16. This nut bears upon the rear end of the resistance-tube, as shown in Figs. 1 and 2, when it is desired to exert a pulling force upon the tooth to be moved or upon the front end of said tube, as shown in Fig. 3, when it is desired to push the tooth to be moved into its desired position. The other end of the bar is bent at right angles to form the projection or lug 17, the outer end of which is adapted to coöperate with the delivery member.

Figure 6:
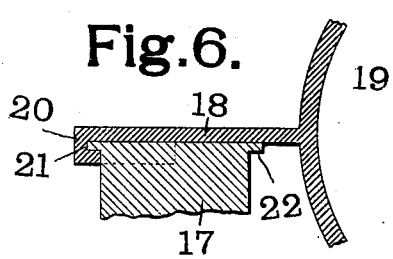

The preferred form of my delivery member, as best seen in Figs. 4, 5, and 6, consists of a band 19 and a disk 18, fastened thereto. The band 19 is adapted to encircle the tooth 11. This disk bears upon one side the projecting segmental flange 20, which is grooved upon its inner surface at 21, as best shown in Fig. 6. This groove 21 in the flange 20 is adapted to coöperate with the flange 22, surrounding the end of the lug 17. When the parts are in this position, as best shown in Fig. 6, it will be evident that a force may be exerted in the direction of the traction-bar, while at the same time any lateral or twisting movement of the tooth 11 will be prevented by the contact of the end of the lug 17 with the face of the plate 18.

In practical operation it is often found necessary to remove the adjustable traction-bar from engagement with the resistance and delivery members or to perform some other operation which, if the bar were allowed to remain in contact with the delivery member, would agitate the tooth undergoing movement, thus causing considerable pain, as the tooth is usually in a sensitive condition. My mechanism, however, allows the traction-bar to be easily disengaged from the delivery means by simply unscrewing the nut 16 and longitudinally advancing or retracting the bar 15, thus withdrawing the lug 17 from contact with the plate 18 and grooved flange 20.

As will be obvious, when it is desired to exert a pushing force upon the tooth the flange 20 is placed upon the side of the plate 18 farthest from the band 19, as shown in Fig. 3; but when it is desired to exert a pulling force the flange 20 is placed upon the side of the plate 18 nearest the band 19, as shown in Fig. 2.

It will be obvious that other changes in the form of my invention are possible. For instance, the flange might be placed upon the plate 18 and the lug 19 be grooved and the same results obtained as by the use of the device above described; but these and other modifications may all be made without departing from my invention and are intended to be covered by the claims below.

Having fully described my invention, what I claim as new, and desire to secure by Letters Patent of the United States, is—

1. In a tooth-regulating device, the combination with a resistance member, of a delivery member, and a traction-bar carried by said resistance member and bearing against said delivery member so as to impart movement thereto in one direction, said traction-bar being at the same time free to move out of engagement with said delivery member by longitudinal movement in the other direction.

2. In a tooth-regulating device, the combination with a resistance member, of a delivery member, a traction-bar carried by said resistance member and bearing against said delivery member so as to impart movement thereto in one direction, said traction-bar being at the same time free to move out of engagement with said delivery member by longitudinal movement in the other direction, and means for preventing lateral movement between said delivery member and traction-bar while they are in engagement.

3. In a tooth-regulating device, the combination with a resistance member, of a delivery member, and a traction-bar carried by said resistance member and bearing against said delivery member and having a pivotal connection therewith, said traction-bar being at the same time free to move out of engagement with said delivery member by its longitudinal movement in one direction.

4. In a tooth-regulating device, the combination with a traction-bar, of a delivery member adapted to be fastened to the tooth to be moved, a segmental groove formed in one of said parts, a projection carried by the other of said parts and adapted to engage with said groove, and a resistance member carrying said traction-bar.

5. The combination with the resistance member and traction-bar, of a cylindrical lug projecting from said traction-bar, a delivery member adapted to be fastened to the tooth to be moved and to engage the end of said lug, a grooved segmental flange upon said delivery member, and a flange upon said lug for coöperating with said groove to hold said lug in contact with said delivery member.

6. In a tooth-regulating device, the combination with a resistance member, of a traction-bar carried thereby, a laterally-projecting lug carried by said traction-bar, a delivery member bearing against the end of said lug and engaging therewith, and means for disengaging said lug from said delivery member by the longitudinal movement of said traction-bar.

7. In a tooth-regulating device, a traction-bar, a delivery member, a laterally-projecting lug carried by one of said parts, a connecting device carried by the other of said parts and bearing against the end of said lug, means for disengaging the said traction-bar and delivery member by the longitudinal movement of said traction-bar, and a resistance member carrying said traction-bar.

8. In a tooth-regulating device, the combination with a resistance member, of a traction-bar carried thereby, a laterally-projecting lug carried by said traction-bar, a flange on said lug, a delivery member bearing against the end of said lug to prevent lateral movement between said member and traction-bar, and a segmental groove in said delivery member engaging with said flange.

In testimony whereof I have hereunto set my hand and affixed my seal in the presence of the two subscribing witnesses.

EDWARD H. ANGLE. [L. S.]

Witnesses:
JAMES H. BRYSON,
W. A. ALEXANDER.